X- RE 31,936

United States Patent [19]

Sperry et al.

[11] E Patent Number: Re. 31,936

[45] Reissued Date of Patent: Jul. 2, 1985

[54] DISPERSING PAINT PIGMENTS

[75] Inventors: Peter R. Sperry, Doylestown, Pa.; Richard J. Wiersema, San Ramon, Calif.; Kayson Nyi, Sellersville, Pa.

[73] Assignee: Rohm and Haas Company, Philadelphia, Pa.

[21] Appl. No.: 536,821

[22] Filed: Sep. 27, 1983

Related U.S. Patent Documents

Reissue of:

[64] Patent No.: 4,102,843
Issued: Jul. 25, 1978
Appl. No.: 757,718
Filed: Jan. 7, 1977

U.S. Applications:

[63] Continuation of Ser. No. 6,132, Jan. 24, 1979.

[51] Int. Cl.[3] ..... C08L 31/00

[52] U.S. Cl. ..... 524/522; 524/558

[56] References Cited

U.S. PATENT DOCUMENTS

| | | | |
|---|---|---|---|
| 2,930,775 | 3/1960 | Fordyce | 260/29.6 |
| 3,223,751 | 12/1965 | Sellet | 260/854 |
| 3,230,275 | 1/1966 | Sekmakas | 260/873 |
| 3,646,099 | 2/1972 | Dannals | 260/465.4 |
| 3,840,487 | 10/1974 | Dyson | 260/29.6 |
| 3,859,260 | 1/1975 | Dannals | 260/79.3 |
| 3,957,711 | 5/1975 | Powanda | 260/29.6 |
| 3,980,602 | 9/1976 | Jakubauskas | 260/29.6 |
| 3,985,698 | 10/1976 | Matsudaira | 260/29.6 |

FOREIGN PATENT DOCUMENTS

| | | |
|---|---|---|
| 50-11440 | 9/1975 | Japan . |
| 998380 | 7/1965 | United Kingdom . |

*Primary Examiner*—Paul R. Michl
*Attorney, Agent, or Firm*—Michael B. Fein

[57] ABSTRACT

An improved glossy, aqueous emulsion paint comprised of a mixture of a film-forming latex polymer and dispersed pigment is prepared by incorporating therein, as pigment dispersant, a water-soluble salt of a low molecular weight copolymer of hydroxyalkyl ester of acrylic or methacrylic acid and acrylic or methacrylic acid.

47 Claims, No Drawings

DISPERSING PAINT PIGMENTS

Matter enclosed in heavy brackets [ ] appears in the original patent but forms no part of this reissue specification; matter printed in italics indicates the additions made by reissue.

*This application is a continuation, of application Ser. No. 006,132, filed Jan. 24, 1979.*

This invention concerns the improvement of water-based, emulsion coating compositions containing a film-forming latex polymer and dispersed pigment, and especially of those compositions containing alkylene glycols and intended to yield moderate to high specular gloss, wherein is incorporated, as pigment dispersant, a water-soluble salt of a relativelly low molecular weight copolymer of certain polar alkyl acrylates or methacrylates and acrylic or methacrylic acid which is compatible with and improves the properties of said aqueous and glycol-containing, pigmented paints. The invention also concerns improved fluid pigment pastes of high solids and low water content containing salt of said copolymer.

The use of low molecular weight polyelectrolytes as dispersing agents for pigments in water-based coatings is well known. U.S. Pat. No. 2,930,775 discloses that salts of copolymers of olefins and maleic anhydride are operable therefor. However, while these dispersants are excellent for many uses, formulations containing these dispersants often exhibit a tendency to foam, sometimes product coatings having inadequate adhesion, and may exhibit poor stability, especially in the presence of divalent cations deriving either from so-called reactive pigments containing zine, barium, lead, etc., or from paint formulation additives containing such cations.

British Pat. No. 998,380 (and its counter part, U.S. Pat. No. 3,223,751) teach that anionic copolymers of three moles of acrylamide and one mole of itaconic acid, or the salts thereof, are pigment dispersing agents. U.S. Pat. No. 3,320,275 deals with interpolymers of 5–45% acrylamide, at least 20% of an acrylic ester, 2–25% of a hydroxyalkylester of an unsaturated acid, and up to 15% of a carboxylic acid monomer which heat cure to form hard, flexible, solvent resistant coatings; however, the use of these resins in aqueous system formulations is not suggested or contemplated.

U.S. Pat. No. 3,840,487 describes dispersing agents which are the salts of the copolymers of 40–95 mole percent acrylic or methacrylic acid and 5 to 60 mole percent of non-functional alkyl acrylate ester. Although such disclosed polyacrylate type compositions are good dispersing agents, we have found they confer greater foaming tendency, have poor stability, and confer generally poorer adhesion and less gloss to latex paint formulations than the copolymers used herein. Such differences on a balance between a hydrophobic comonomer and (meth)acrylic acid to achieve solubility of the copolymer dispersant in alkylene glycols, whereas we rely on hydrophilic and hydrogen-bondable, yet nonionic, comonomers to promote solubility.

U.S. Pat. Nos. 3,645,099 and 3,859,260 disclose water-soluble oligomers of the formulas H-(hydroxyethyl acrylate)$_{10}$-(acrylic acid)$_1$-$SO_3Na$ and H-(hydroxypropyl acrylate)$_5$-(acrylic acid)$_{15}$-$SO_3An$ which are described as useful as conductive agents and surface active agents. There is no suggestion that such sulfonate (sulfamate) salts of said oligomers could be used as pigment dispersants in paint formulations.

The pigment dispersant embodied in this invention is the water-soluble, alkali metal (e.g., sodium, potassium), ammonium, or amine (e.g., triethyl amine, dimethylaminoethanol, 2-amino-2-methyl-1-propanol, ethyl amine, diethyl amine, butyl amine, ethanol amine, N-methyl ethanol amine, and the like) salt of a copolymer consisting essentially of polymerized units of [(A) 45 to 90 weight percent, preferably 55 to 80%, and more preferably 60–75%, of at least one hydroxyalkylester of acrylic acid or methacrylic acid, wherein the alkyl group of the ester moiety has from two to six carbon atoms, preferably two to three, (representative esters include 2-hydroxyethyl methacrylate, 2-hydroxypropyl methacrylate, 2,3-dihydroxypropyl methacrylate, 2-hydroxyethyl acrylate, 2-hydroxypropyl acrylate, 2,3-dihydroxypropyl acrylate, and the like); and (B) 10 to 55 weight percent, preferably 20 to 45%, and more preferably 25–40%, of acrylic acid or methacrylic acid.]

*(A) 30 to 90 weight percent, preferably 45 to 90% more preferably 55 to 80%, and still more preferably 60–75%, of at least one hydroxyalkylester of acrylic acid or methacrylic acid, wherein the alkyl group of the ester moiety has from two to six carbon atoms, preferably two to three, (representative esters include 2-hydroxyethyl methacrylate, 2-hydroxypropyl methacrylate, 2,3-dihydroxypropyl methacrylate, 2-hydroxyethyl acrylate, 2-hydroxypropyl acrylate, 2,3-dihydroxypropyl acrylate, and the like); and*

*(B) 10 to 70 weight percent; preferably 10 to 55%, more preferably 20 to 45%, and still more preferably 25–40%, of acrylic acid, methacrylic acid, itaconic acid, or the half ester or half amide of itaconic acid, preferably methacrylic acid.*

Of course, mixtures of the various monomers can be used.

The copolymer may optionally contain minor amounts, i.e., up to about 30% of polymerized units of other monomers which, in such limited amounts, do not [effect] *affect* the solubility of the copolymer. Such comonomers include methyl acrylate, ethyl acrylate, n-butyl acrylate, sec-butyl acrylate, isobutyl acrylate, t-butyl acrylate, the corresponding methacrylate analogs, acrylamide, acrylonitrile, and diacetone acrylamide.

The number average molecular weight of the copolymer dispersant embodied herein is in the range of about 500 to about 15,000, preferably from about 1,000 to about 10,000, determined by gel permeation chromatography.

The copolymer dispersants are prepared by solution polymerization techniques in aqueous media which optionally for economy and convenience may contain the desired alkylene glycol diluent. The appropriate monomeric mixture is generally reacted under oxygen-free conditions at temperatures within the range of about 30° to 150° C. in the presence of such free radical initiators as t-butyl peroxypivalate, t-butyl peracetate, ammonium persulfate, t-butyl hydroperoxide, cumene hydroperoxide, and like free radical catalysts including free radial redox polymerization initiators. Catalyst concentrations of about 1 to 15% by weight of the monomers are useful to obtain the low molecular weight polymers desired. Sufficient alkali metal hydroxide, ammonium hydroxide, or watersoluble amine, preferably a slight excess, is added during polymerization or subsequently to neutralize free acid groups on the copolymer, thus converting the dispersant to the operable salt. As is well known, catalyst fragments such as derived from a persulfate may appear as part of the polymer. In accordance with this invention, a method for improving the properties and performance of an aqueous emulsion (latex) paint is provided, wherein said paint, comprising a mixture of a film-forming latex polymer and a pigment dispersion, from about 0.1 to about 5%, based on weight of the pigment, preferably 0.1 to 2%, of the aforedescribed copolymer salt is incorporated. An additional embodiment of the invention involves such an aqueous emulsion paint formulation modified for higher gloss by the addition thereto of from about 0.1 to about 2 pounds, preferably 0.5 to 1.3 lbs., of alkylene glycol per gallon of paint. The alkylene glycol, for example, ethylene glycool, propylene glycol, which is preferred, and hexylene glycol, functions to slow the drying rate of the paint, increasing the wet-edge time, and to improve leveling, as well as generally causing the development of higher glass than with an all aqueous system.

Suitable latexes for paints are aqueous addition polymer dispersions, generally obtained most conveniently by direct emulsion polymerization. The most important of these dispersions used in making water-based paints are polymers including homopolymers and copolymers of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylte, ethyl methacrylate and butyl methacrylate; and (3) mono- and di-ethylenically unsaturated hydrocarbons, such as ethylene, isobutylene, styrene, and alipatic dienes, such as butadiene, isoprene, and chloroprene.

Poly(vinyl acetate) and copolymers of vinyl acetate with one or more of the following monomers; vinyl chloride, vinylidene chloride, styrene, vinyltoluene, acrylonitrile, methacrylonitrile, one or two of the acrylic and methacrylic acid esters mentioned above are well known as the film-forming component of aqueous base paints. Similarly copolymers of one or more of the a crylic or methacrylic acid esters mentioned above with one or more of the following monomers: vinyl acetate, vinyl chloride, vinylidene chloride, styrene, vinyltoluene, acrylonitrile, and methacrylonitrile are also more or less conventionally employed in aqueous base paints. Homopolymers of ethylene, isobutylene, and styrene, and copolymers of one or more of these hydrocarbons with one or more esters, nitriles or amides of acylic acid or of methacrylic acid or with vinyl esters, such as vinyl acetate and vinyl chloride, or with vinylidene chloride are also used. The diene polymers are generally used in aqueous base paints in the form of copolymers with one or more monomers following: styrene, vinyltoluene, acrylonitrile, methacrylonitrile, and the abovementioned esters of acrylic acid or methacrylonitrile, and the abovementioned esters of acrylic acid or methacrylic acid. It is also quite common to include a small amount, such as ½ to 2.5% or more, of an acid monomer in the monomer mixture used for making the copolymers for all three general types mentioned above by emulsion polymerzation. Acids used include acrylic, methacrylic, itaconic, aconitic, citraconic, crotonic, maleic, fumaric, the dimer of acrylic acid, and so on.

These aqueous dispersions as the emulsion polymer in the paint may be made using one or more emulsifiers of anionic, cationic, or non-ionic type. Mixtures of two or more emulsifiers rgardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often unnecessary and this omission or the use of only a small amount, e.g., less than about 0.5%, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce coatings less liable to swelling or softening, particularly when subjected to humid atmospheres. The average particle size or diameter of these dispersed polymers may be from about 0.03 to 3 microns or even larger. The particle size, whenever referred to herein, is the "weight average diameter." This number, expressed in microns, is determined using the ultra-centrifuge. A description of the method can be found in the Journal of Colloid Science 15, pp. 563–572, 1960 (J. Brodnyan). In general, the molecular weights of these emulsion polymers are high, e.g., from about 100,000 to 10 million viscosity average, most commonly above 500,000.

In general, a gallon of emulsion paint is comprised of about 0.5 to 3 lbs. of film-forming resin and about 0.2 to about 5 lbs. of finely-divided pigment. Typical pigments are titanium dioxide and other titanium pigments, white lead, zinc, oxide, zinc sulfide, barium sulfate, calcium carbonate, lithopone, silica, talc, mica, clays, iron oxide, carbon black, cadmium sulfide, toluidene red, chrome orange, chrome yellow, chrome green, and others known in the artm. Tyical latices of film-forming resins are those of the alkyl acrylates and methacrylates, vinyl acetate, styrene-butadiene, and others known in the art. Minor amounts of other coatings additives may be included in the paint formulations, for example, antifoams, mildewcides, thickeners, wetting agents, bacteriostats, etc.

Another aspect of the invention is the provision of dispersions of pigments as fluid pastes of high solids content and low aqueous media content (said aqueous media comprising water or water and a minor or major proportion of alkylene glycol as aforementioned) containing in admixture a relatively minor amount of the described water-soluble salt of the copolymer of ethylenically unsaturated acid and the hydroxyalkyl ester thereof as dispersant. The amount of the salt of the copolymer effecting dispersion of solids and fluidity of the pigment paste will usually not be over about three percent of the weight of pigment and may be as low as about 0.05%.

For the preparation of these pigment pastes, it is generally most convenient to prepare an aqueous solution of copolymer in salt form. Concentrations of 5 to 40% may be used, although those of 10 to 20% are usually preferred. Pigment, water (including an alkylene glycol), and solutions are mixed. If desired, the paste or suspension may be ground in a mill—a pebble mill, roll mill, colloid mill, or high speed stone mill, or in some instances a high shear mixer being suitable. Sufficient copolymer is used to ensure good dispersion and fluidity of the paste. The optimum amount of copolymer will depend upon the specific pigmement or pigments and upon the state of subdivision thereof. In general, the finer the particle size the more dispersant should be used. Concentrated pastes can be extended to give dilute pastes, when the latter are needed. The pigment pastes are a suitable and convenient composition for addition to aqueous resin latexes or dispersions, as previously discussed, to form emulsion paints. Moreover, fluid pastes of certain pigments have diverse uses, for example, such high solids content slurries of calcium hydroxide are useful for coatings as white-wash, field markings, or the like, or as concentrated alkaline reagents in chemical manufacturing; dispersions of carbon blacks in aqueous media are useful in the fields of paper, cement, water-base paints, coating compositions, inks, rayons, and rubber. The pigments may be present in the foregoing pastes in an amount up to 85% by weight of the paste.

In the representative examples next presented, the following abbreviations are used for the sake of brevity;

MAA: methacrylic acid
AA: acrylic acid
HEMA: 2-hydroxyethyl methacrylate
HMPA: 2-hydroxypropyl methacrylate
DHPMA: 2,3-dihydroxypropyl methacrylate
BMA: N-butyl methacrylate Various illustrative processes for preparing the copolymer dispersants used in the invention are as follows.

PROCESS A

A two-liter, four-necked, round bottomed flask fitted with stirrer, reflux condenser, heating mantle, two additional funnels and nitrogen inlet, is charged with 348 g. isopropanol which is heated to reflux under nitrogen. A monomer mixture of 143 g. HEMA and 94.6 g. glacial MAA is added simultaneously over a one hour period with the addition of a solution of 18.8 g. "Lupersol 11" (57% t-butyl peroxypivalate) in 94 g. isopropanol while maintaining the reactor contents at reflux (84° C.). Reflux is maintained for another hour. The resulting polymer solution (36.3% solids, viscosity=1825 centipoise, Brookfield LV #2, 12 rpm) is added gradually along with addition of equivalent amounts of 50% NaOH solution (to maintain homogeneity) to 300 g. water heated to reflux in a similar reaction vessel fitted with a distillation head. Isopropanol and water are distilled off until the vapor temperature reaches 100° C. The pH of the clear colorless product is adjusted to 9.6 with additional caustic solution, and solids concentration is diluted to 25% (solution viscosity=39.5 cps., LV #2, 60 rpm). The dissolved copolymer is composed of HEMA/MAA in a 60/40 weight ratio.

PROCESS B

A reaction flask as described above is charged with 300 g. propylene glycol which is heated to 150° C. under nitrogen blanket. A solution of 210 g. HEMA, 90 g. MMA, 3 g. mercaptoethanol and 12 g. "Lupersol 70" (75% t-butyl peracetate) is added over a five hour period while maintaining temperature at 150° C. Addition of 1.2 g. more of "Lupersol 70" without exotherm indicates completion of reaction; however, heating is continued for 30–45 minutes.

Vacuum is applied and about 160 g. propylene glycol is removed at 120° C./30 mm Hg. The contents are cooled to 50° C. and 50% aqueous NaOH is added gradually until the pH of the solution is 9.2. The copolymer solution, adjusted to 50% solids concentration by water addition, contains 19% propylene glycol. Its appearance is light amber, viscosity=1,000 cps. (LV #2, 6 rpm); adjusted to 25% solids, viscosity=16 cps. The dissolved copolymer is composed of HEMA/MMA in a 70/30 weight ratio.

PROCESS C

A five-liter flask equipped as those described above is charged with 1955 g. water and 567.3 g. propylene glycol and the solution heated to 90° C. while sparging with nitrogen. 45% of a catalyst solution of 62.5 g. ammonium persulfate in 312.5 g. water is added, and then the remainder of the catalyst solution and 480.75 g. MAA and 1121.75 g. HEMA are added simultaneously over a 1.5 hours period. The reaction mixture is held at 92°–95° C. for an additional hour. The viscosity of the mixture is 82.5 cps. (LV, #2, 60 rpm).

The mixture is cooled and 430 g. of 50% aqueous NaOh are added gradually to give a pH of 9.6. The propylene glycol content of the solution is 11.2%, dissolved solids content is 42%, viscosity 360 cps. (LV #2, 30 rpm); when diluted to 25% solids, viscosity is 23 centipoise. The dissolved copolymer is composed HEMA/MAA in a 70/30 weight ratio.

Various copolymer compositions are thus prepared according to the one of the above processes, as summarized in Table I below.

TABLE I

| Example No. | Monomers in Copolymer, and Weight Ratios | | Process Polymerization | Product Solution (Na⁻ Salt) pH | % Solids | Viscosity Cps. |
|---|---|---|---|---|---|---|
| 1 (control) | MAA | | C | 9.7 | 25 | 40 |
| 2 | HEMA/MAA. | 30/70 | A | 9.7 | 25 | 36 |
| 3 | " | 50/50 | B | 9.5 | 25 | 20 |
| 4 | " | 50/50 | C | 9.5 | 25 | 31 |
| 5 | " | 60/40 | A | 9.6 | 25 | 40 |
| 6 | " | 60/40 | B | 9.1 | 25 | 13 |
| 7 | " | 60/40 | C | 9.2 | 25 | 30 |
| 8 | " | 70/30 | B | 9.2 | 25 | 16 |
| 9 | " | 70/30 | C | 9.6 | 25 | 23 |
| 10 | " | 70/30 | C | 9.5 | 25 | 27 (NH⁻ salt of Exp. 9) |
| 11 | " | 75/25 | C | 9.3 | 25 | 27 |
| 12 | " | 80/20 | A | 9.1 | 25 | 28 |
| 13 | HPMA/MAA. | 70/30 | B | 9.2 | 25 | 12 |
| 14 | HEMA/AA. | 60/40 | A | 9.7 | 35 | 28 |
| 15 | " | 80/20 | A | 9.5 | 26 | 25 |
| 16 | *DHPMA/MAA. | 30/70 | C | 9.5 | 35 | 856 |
| 17 | " | 50/50 | C | 9.5 | 35 | 498 |

TABLE I-continued

| Example No. | Monomers in Copolymer, and Weight Ratios | | Process Polymerization | Product Solution (Na⁺ Salt) pH | % Solids | Viscosity Cps. |
|---|---|---|---|---|---|---|
| 18 | " | 70/30 | C | 9.8 | 35 | 210 |
| 19 | BMA/HEMA/MAA | 32/29/39 | A | 9.1 | 35 | 125 |

*DHPMA introduced as isopropylidene glycerol methacrylate and allowed to hydrolyze to DHPMA in situ

EVALUATION OF POLYMERS AS PIGMENT DISPERSANTS

The above described polymers, along with an additional prior art control U.S. Pat. No. 2,930,775), are evaluated as pigment dispersants to produce semigloss latex paints in accordance with the general formulation given below. All components are maintained in equal proportion with the exception of pigment dispersant level which is specified in Table II as a percentage based on total pigment weight.

The following ingredients in parts by weight are charged to a suitable steel vessel and ground in a Cowles dissolver (high speed dispersing mill) at about 4,000 peripheral feet per minute for 20 minutes to prepare a pigment paste.

| | |
|---|---|
| Propylene glycol | 60.0 |
| Polymeric dispersant in water | 9.2 |
| Water | 5.1 |
| Zinc Oxide | 25.0 |
| Rutile Titanium Dioxide | 250.0 |
| Nopoc "NXZ" antifoaming agent | 1.0 |
| Octylphenoxypolyethoxyethanol $(OPE)_{9-10}$ (surfactant) | 2.5 |
| Tert-butylaminoethanol (wetting agent) | 3.7 |

The dispersions are then "let-down" at a lower speed with:

| | |
|---|---|
| Water | 30.0 |
| Propylene glycol | 38.0 |
| Eastman "Texanol" coalescing aid (pentanediol monoisobutyrate) | 25.0 |
| Nopco "NXZ" antifoaming agent | 1.0 |

-continued

| | |
|---|---|
| 2-N—octyl-4-isothiazolin-3-one, 45% active ingredient (mildewcide) | 2.0 |
| Hercules "Natrosol 250 MR" hydroxyethyl cellulose thickener, 3% active ingredient in water | 72.7 |
| Acrylic copolymer latex (50.7% Methyl methacrylate, 1.3% methyl acrylate, 48% butyl acrylate, 46% solids, pH 9.5) | 546.7 |

The paint formulations are evaluated for the critical properties of specular gloss, viscosity at high and low shear rate, and stability thereof when subjected to elevated temperature and to freeze-thaw cycling in accordance with the following procedures.

| | |
|---|---|
| Specular gloss: | ASTM D523-67 (reapproved 1972) |
| Low Shear Viscosity: | Stormer viscosity (KU). ASTM D562-55 (reapproved 1972) |
| High Shear Viscosity: | ICI Cone and Plate (poise). Research Equipment (London). Ltd. |
| Stability Conditions: | (Closed paint cans) |
| Equilibrated: | 240 hours at room temperature |
| Heat Aged: | 240 hours at 140° F. |
| Freeze thaw: | 5 cycles wherein one cycle is 16 hours at −10° C., followed by 8 hours at room temperature. |

All formulations are sheared by shaking for 15 minutes on a Red Devil paint mixer prior to measuring viscosity.

Test results are summarized In Table II, below.

TABLE II

| Formulation No. | Dispersant (of example) | % Dispersant (on pigment) | 60° Gloss Heat aged sample | Stormer Viscosity (Low Shear, KU) Init. | equilibrated | Heat aged | freeze-thaw | Brushing Viscosity (High Shear, ICI) equilibrated | Heat aged | freeze-thaw |
|---|---|---|---|---|---|---|---|---|---|---|
| a | 1 (control) | 1.0 | 25 | 71 | 70 | 67 | 80 | 1.1 | 1.1 | 1.1 |
| b | Control* | 1.0 | 55 (Initial) | 75 | 70-gel (var. results) | gel | gel | ~2+ | gel | gel |
| c | 2 | 1.0 | 43 | 72 | 72 | 69 | 72 | 1.2 | 1.0 | 1.2 |
| | | 1.1 | 36 | 72 | 72 | 63 | 72 | 1.2 | 1.1 | 1.1 |
| d | 3 | 1.0 | 48 | 70 | 72 | 72 | 79 | 1.3 | 1.1 | 1.4 |
| | | 1.8 | 43 | 70 | 72 | 72 | 77 | 1.0 | 1.0 | 1.1 |
| e | 4 | 1.0 | 54 | 72 | 67 | 67 | 67 | 1.0 | 1.0 | 1.1 |
| f | 5 | 1.0 | 56 | 72 | 74 | 67 | 72 | 1.3 | 1.1 | 1.2 |
| | | 1.7 | 51 | 72 | 76 | 69 | 72 | 1.2 | 1.1 | 1.2 |
| g | 6 | 1.0 | 52 | 72 | 72 | 77 | 79 | 1.0 | 1.1 | 1.1 |
| | | 2.2 | 45 | 72 | 72 | 72 | 79 | 1.1 | 1.0 | 1.2 |
| h | 7 | 1.0 | 59 | 74 | 67 | 67 | 72 | 1.1 | 1.1 | 1.1 |
| i | 8 | 1.0 | 64 | 70 | 72 | 77 | 87 | 1.2 | 1.3 | 1.3 |
| | | 2.7 | 60 | 70 | 72 | 67 | 79 | 1.1 | 1.1 | 1.1 |
| j | 9 | 1.0 | 67 | 83 | 82 | 82 | 77 | 1.2 | 1.2 | 1.3 |
| | | 1.5 | 62 | 72 | 72 | 77 | 82 | 1.1 | 1.1 | 1.1 |
| | | 2.0 | 55 | 72 | 72 | 67 | 77 | 1.2 | 1.1 | 1.1 |
| | | 2.5 | 53 | 72 | 72 | 67 | 72 | 1.1 | 1.1 | 1.1 |
| k | 10 | 2.5 | 43 | — | 77 | 72 | 77 | 1.2 | 1.1 | 1.2 |

TABLE II-continued

| Formulation No. | Dispersant (of example) | % Dispersant (on pigment) | 60° Gloss Heat aged sample | Stormer Viscosity (Low Shear, KU) Init. | equilibrated | Heat aged | freeze-thaw | Brushing Viscosity (High Shear, ICI) equilibrated | Heat aged | freeze-thaw |
|---|---|---|---|---|---|---|---|---|---|---|
| m | 11 | 1.0 | 66 | 86 | 82 | 82 | 80 | 1.3 | 1.3 | 1.4 |
| n | 12 | 1.0 | 56 | 95 | 72 | 69 | 82 | 1.4 | 1.3 | 1.4 |
| | | 2.5 | 64 | 89 | 69 | 67 | 72 | 1.0 | 1.1 | 1.1 |
| o | 13 | 2.4 | 70 | 75 | 82 | 77 | 82 | 1.2 | 1.3 | 1.3 |
| p | 14 | 1.0 | 57 | 72 | 79 | 67 | 86 | 1.3 | 2.5 | 1.2 |
| | | 1.7 | 52 | 72 | 77 | 72 | 76 | 1.2 | 1.1 | 1.2 |
| q | 15 | 1.0 | 45 | 89 | 79 | 86 | >141 | 1.5 | 1.8 | 2.0 |
| | | 3.0 | 59 | 89 | 82 | 67 | 88 | 1.3 | 1.3 | 1.6 |
| r | 16 | 1.0 | 47 | 74 | 67 | 67 | 67 | 1.1 | 1.0 | 1.0 |
| s | 17 | 1.0 | 57 | 77 | 67 | 67 | 72 | 1.1 | 1.0 | 0.9 |
| t | 18 | 1.0 | 67 | 86 | 86 | 82 | 82 | 1.2 | 1.2 | 1.2 |
| u | 19 | 1.0 | 58 | 82 | 82 | 77 | 84 | 1.3 | 1.2 | 1.3 |

*This control is the sodium salt of diisobutylene-maleic copolymer anhydride (1:1 mole ratio) described by Fordyce et al. U.S. Pat. No. 2,930,775

All paints with the present dispersants exhibit excellent viscosity stability. A steady improvement in specular gloss with increasing nonionic comonomer content is observed; however, excessive nonionic comonomer content leads to poor stability if used at inadequate levels (Formulation q). Very poor gloss is found with the methacrylic acid control dispersant (Formulation a). Very poor stability is found with the other control dispersant (Formulation b).

In all cases except Formulation b, adhesion of the test paints to a glossy oil based alkyl paint (duPont Outside Trim and Shutter Gloss Enamel, Code 801C Light Green) is excellent.

In a test for foaming tendency, dispersant samples are diluted to 5 weight percent solids with water and shaken vigorously in jars. With the exception of the control dispersant used in Formulation b, all of the materials confer little or no foaming tendency.

What is claimed is:

[1. An improved aqueous emulsion paint comprising a mixture of a film-forming latex polymer and a pigment dispersion, containing as dispersant, from about 0.01 to about 5%, based on pigment weight, of a water-soluble alkali metal, ammonium, or amine salt of a copolymer having a number average molecular weight in the range of about 500 to about 15,000 consisting essentially of polymerized units of (A) 45 to 90 weight percent of hydroxyalkyl ester of acrylic acid or methacrylic acid, wherein the alkyl group of the ester moiety has from two to six carbon atoms; and (B) 10 to 55 weight percent of acrylic acid, methacrylic acid, itaconic acid, or the half ester or half amide of itaconic acid.]

2. A paint according to claim [1] *56* containing from about 0.1 to about 2 pounds per gallon of paint, of ethylene glycol, propylene glycol of hexylene glycol, about 0.5 to 3 pounds of film-forming latex polymer per gallon of paint and about 0.2 to about 5 pounds of pigment per gallon of paint.

3. A paint in accordance with claim [1] *56* wherein the copolymer dispersant has a number average molecular weight of from about 1,000 to about 10,000, component (A) is 55 to [80%] *75%* and is selected from the group consisting of 2-hydroxyethyl methacrylate, 2-hydroxypropyl methacrylate, 2,3-dihydropropyl methacrylate, 2-hydroxyethyl acrylate, 2-hydroxypropyl acrylate, and 2,3-dihydroxypropyl acrylate; and component (b) is [20] *25* to 45% and is selected from the group consisting of acrylic acid and methacrylic acid.

4. A paint in accordance with claim 3 containing from about 0.5 to 1.3 pounds per gallon of paint of ethylene glycol, propylene glycol or hexylene glycol.

5. A paint in accordance with claim 3 in which the salt of the copolymer is the sodium salt, component (A) is 60 to 75% and is 2-hydroxyethyl methacrylate, and component (B) is 25 to 40% and is methacrylic acid.

6. A paint in accordance with claim 3 in which the salt of the copolymer is the sodium salt, component (A) is 60 to 75% and is 2-hydroxypropyl methacrylate, and component (B) is 25 to 40% and is methacrylic acid.

7. A paint in accordance with claim 3 in which the salt of the copolymer is the sodium salt, component (A) is 60 to 75% and is 2,3-dihydroxypropyl methacrylate, and component (B) is 25 to 40%, and is methacrylic acid.

8. A paint in accordance with claim 4 in which the salt of the copolymer is the sodium salt.

9. A paint in accordance with claim 4 in which the salt of the copolymer is the ammonium salt. [10. A method for improving the properties and performance of an aqueous emulsion paint comprising a mixture of a film-forming latex polymer and a pigment dispersion which comprises incorporation therein as pigment dispersant, from about 0.01 to about 5%, based on pigment weight of a water-soluble alkali metal, ammonium, or amine salt of a copolymer having a number average molecular weight in the range of about 500 to about 15,000 consisting essentially of polymerized units of (A) 45 to 90 weight percent of hydroxyalkyl ester of acrylic acid or methacrylic acid, wherein the alkyl group of the ester moiety has from two to six carbon atoms; and (B) 10 to 55 weight percent of acrylic acid, methacrylic acid, itaconic acid, or the half ester or half amide thereof.]

11. A method according to claim [10] *7* wherein the paint emulsion contains from about 0.1 to about 2 pounds per gallon of paint of ethylene glycol, propylene glycol or hexylene glycol, about 0.5 to 3 pounds of film-forming latex polymer per gallon of paint and about 0.2 to about 5 pounds of pigment per gallon of paint.

12. A method in accordance with claim [10] *57* wherein the copolymer dispersant has a number average molecular weight of from about 1,000 to 10,000, component (A) is 55 to [80%] *75%* and is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate; and component (B) is [20] *25* to 45%, and acrylic acid or methacrylic acid.

13. A method in accordance with claim 12 wherein the paint emulsion contains from about 3.5 to 1.3 pounds per gallon of paint of ethylene glycol, propylene glycol and hexylene glycol.

14. A method in accordance with claim 12 wherein the salt of the copolymer is the sodium salt, component (A) is 60 to 75% and is 2-hydroxyethyl methacrylate, and component (B) is 25 to 40% and is methacrylic acid.

15. A method in accordance with claim 12 wherein the salt of the copolymer is the sodium salt, component (A) is 60 to 75% and is 2-hydroxypropyl methacrylate, and component (B) is 25 to 40% and is methacrylic acid.

16. A method in accordance with claim 12 wherein the salt of the copolymer is the sodium salt, comonent (A) is 60 to 75% and is 2,3-hydroxypropyl methacrylate, and component (B) is 25 to 40% and is methacrylic acid.

17. A method in accordance with claim 13 wherein the salt of the copolymer is the sodium salt.

18. A method in accordance with claim 13 wherein the salt of the copolymer is the ammonium salt.

[19. A method of dispersing a finely divided pigment in water, comprising the step of mixing said pigment with water and, with about 0.01 to about 5%, based on physical weight, of a water-soluble alkali metal, ammonium, or amine salt of a copolymer having a number average molecular weight in the range of about 500 to about 15,000 consisting essentially of polymerized units of (A) 45 to 90 weight percent of hydroxyalkyl ester of acrylic acid or methacrylic acid, wherein the alkyl group of the ester moiety has from two to six carbon atoms; and (B) 10 to 55 weight percent of acrylic acid, methacrylic acid, itaconic acid, or the half ester or half amide or itaconic acid.]

20. The method of claim [19] *58* in which said copolymer dispersant has a number average molecular weight of from about 1,000 to about 10,000, component (A) is 55 to [90%] *75%* and is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate; and component (B) is [20] *25* to 45% and is selected from acrylic acid and methacrylic acid, and said acid water contains up to 2 pounds of a glycol per gallon. [21. A pigment paste comprising a water-based suspension of finely-divided pigment dispersed with about 0.05% to about 3%, on the weight of pigment, of a water-soluble alkali metal, ammonium, or amine salt of a copolymer having a number average molecular weight in the range of about 1,000 to about 10,000 consisting essentially of polymerized units of (A) 45 to 90 weight percent of hydroxyalkyl ester of acrylic acid or methacrylic acid, wherein the alkyl group of the ester moiety has from two to six carbon atoms; and (B) 10 to 55 weight percent of acrylic or methacrylic acid.]

22 [A paste] *The method* in accordance with claim [19] *58* which contains ethylene glycol, propylene glycol or hexylene glycol.

23. A paste in accordance with claim [19] *58* wherein the copolymer dispersant has a number average molecular weight of from about 2,000 to 7,000, component (A) is 55 to [80%] *75%* and is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate; and component (B) is 20 to 45%.

24. A [plate] *paste* in accordance with claim [21] *59* which contains ethylene glycol, propylene glycol or hexylene glycol.

25. A paste in accordance with claim 22 in which the salt of the copolymer is the sodium salt, component (A) is 60 to 75% and is 2-hydroxyethyl methacrylate, and component (B) is 25 to 40% and is methacrylic acid.

26. A paste in accordance with claim 22 in which the salt of the copolymer is the sodium salt, component (A) is 60 to 75% and is 2-hydroxypropyl methacrylate, and comonent (B) is 25 to 40% and is methacrylic acid.

27. A paste in accordance with claim 22 in which the salt of the copolymer is the sodium salt, component (A) is 60 to 75% and is 2,3-dihydroxypropyl methacrylate, and component (B) is 25 to 40% and is methacrylic acid.

28. A paste in accordance with claim 22 in which the salt of the copolymer is the sodium salt.

29. A paste in accordance with claim 22 in which the salt of the copolymer is the ammonium salt.

*30. An improved aqueous emulsion paint comprising a mixture of film-forming latex polymer and a pigment dispersion, containing as dispersant, from about 0.01 to about 5%, based on pigment weight, of a water-soluble alkai metal, ammonium, or amine salt of a copolymer having a number average molecular weight in the range of about 500 to about 5,000 consisting essentially of polymerized units of (A) 29 to 75 weight percent of a hydroxyalkyl ester of acrylic acid or methacrylic acid, wherein the alkyl group of the ester moiety has from two to six carbon atoms; and (B) 25 to 70 weight percent of acrylic acid, methacrylic acid, itaconic acid, or the half ester or half amide of itaconic acid.*

*31. A paint in accordance with claim 30 wherein the copolymer dispersant has a number average molecular weight of from about 1,000 to about 10,000, component (A) and is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate and is selected from the group consisting of acrylic acid and methacrylic acid.*

*32. A method for improving the properties and performance of an aqueous emulsion paint comprising a mixture of a film-forming latex polymer and a pigment dispersion which comprises incorporation therein as pigment dispersant, from about 0.01 to about 5%, based on pigment weight of a water-soluble alkali metal, ammonium, or amine salt of a copolymer having a number average molecular weight in the range of about 500 to about 15,000 consisting essentially of polymerized units of (A) 29 to 75 weight percent of hydroxyalkyl ester of acrylic acid or methacrylic acid, wherein the alkyl group of the ester moiety has from two to six carbon atoms; and (B) 25 to 70 weight percent of acrylic acid, methacrylic acid, itaconic acid, or the half ester or half amide thereof.*

*33. A method in accordance with claim 32 wherein the copolymer dispersant has a number average molecular weight of from about 1,000 to 10,000 component (A) selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate; and component (B) is acrylate acid or methacrylic acid.*

*34. A method of dispersing a finely divided pigment in water, comprising the step of mixing said pigment with water and, with about 0.01 to about 5%, based on physical*

*weight, of a water-soluble alkali metal, ammonium, or amine salt of a copolymer having a number average molecular weight in the range of about 500 to about 15,000 consisting essentially of polymerized units of (A) 29 to 75 weight percent of hydroxyalkyl ester of acrylic acid or methacrylic percent of hydroxyalkyl ester of acrylic acid or methacrylic acid, wherein the alkyl group of the ester moiety has from two to six carbon atoms; and (B) 25 to 70 weight percent of acrylic acid, methacrylic acid, itaconic acid, or the half amide of itaconic acid.*

*35. The method of claim 34 in which said copolymer dispersant has a number average molecular weight of from about 1,000 to about 10,000, component (A) and is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate and is selected from acrylic acid and methacrylic acid, and said water contains up to 2 pounds of a glycol per gallon.*

*36. A pigment paste comprising a water-based suspension of finelydivided pigment dispersed with about* 0.05% *to about 3%*, on the weight of pigment, of a water-*soluble alkali metal, ammonium, or amine salt of a copolymer having a number average molecular weight of pigment, of a water-soluble alkali metal, ammonium, or amine salt of a copolymer having a number average molecular weight in the range of about 1,000 to 10,000 consisting essentially of polymerized units of (A) 45 to 75 weight percent of a hydroxylalkyl ester of acrylic acid or methacrylic acid, wherein the alkyl group of the ester moiety has from two to six carbon atoms; and (B) 25 to 70 weight percent of acrylic acid methacrylic acid, itaconic acid, or the half ester or half amide of itaconic acid.*

*37. A paste in accordance with claim 36 wherein the copolymer dispersant has a number average molecular weight of from about 2,000 to 7,000, component (A) selected from the group consisting of 2-hydroxyethyl methacrylate, 2-hydroxypropyl methacrylate, 2,3,-dihydroxypropyl methacrylate, 2-hydroxyethyl acrylate, 2-hydroxypropyl acrylate, and 2,3-dihydroxypropyl acrylate.*

*38. A paste in accordance with claim 24 in which the salt of the copolymer is the sodium salt, component (A) is 2-hydroxyethyl methacrylate, and component (B) is methacrylic acid.*

*39. A paste in accordance with claim 24 in which the salt of the copolymer is the sodium salt, component (A) is 2-hydroxypropyl methacrylate, and component (B) is methacrylic acid.*

*40. A paste in accordance with claim 24 in which the salt of the copolymer is the sodium salt, component (A) is 2,3-dihydroxypropyl methacrylate, and component (B) is methacrylic acid.*

*41. A paste in accordance with claim 36 in which the salt of the copolymer is the sodium salt.*

*42. A paste in accordance with claim 36 in which the salt of the copolymer is the ammonium salt.*

*43. A paste in accordance with claim 41 in which compound (A) is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate, and component (B) is acrylic acid or methacrylic acid.*

*44. A paste in accordance with claim 42, in which compound (A) is selected from the group consisting of 2-hydroxyethyl methacrylate, 2-hydroxypropyl methacrylate, 2,3-dihydroxypropyl methacrylate, 2-hydroxyethyl acrylate, 2-hydroxypropyl acrylate, and 2,3-dihydroxypropyl acrylate, and component (B) is acrylic acid or methacrylic acid.*

*45. A paint in accordance with claim 10 in which up to 30% of an optional monomer selected from methyl acrylate or methacrylate, ethyl acrylate or methacrylate, n-butyl acrylate or methacrylate, sec-butyl acrylate or methacrylate, isobutyl acrylate or methacrylate, tertiary butyl acrylate or methacrylate, acrylamide, acrylonitrile, or diacetone acrylamide is included among the polymerized monomers, with the proviso that they are used in such limited amounts as to not affect the solubility of the copolymer.*

*46. A method according to claim 1 in which up to 30% of an optional monomer selected from methyl acrylate or methacrylate, ethyl acrylate or methacrylate, n-butyl acrylate or methacrylate, sec-butyl acrylate or methacrylate, isobutyl acrylate or methacrylate, tertiary butyl acrylate or methacrylate, acrylamide, acrylonitrile, or diacetone acrylamide is included among the polymerized monomers, with the proviso that they are used in such limited amounts as to not affect the solubility of the copolymer.*

*47. A pigment paste according to claim 23 in which up to 30% of an optional monomer selected from methyl acrylate or methacrylate, ethyl acrylate or methacrylate, n-butyl acrylate or methacrylate, sec-butyl acrylate or methacrylate, isobutyl acrylate or methacrylate, tertiary butyl acrylate or methacrylate, acrylamide, acrylonitrile, or diacetone acrylamide is included among the polymerized monomers, with the proviso that they are used in such limited amounts as to not affect the solubility of the copolymer.*

* * * * *